July 10, 1962 G. H. HANNON 3,043,156
VARIABLE SPEED REPETITIVE CYCLE TRANSMISSION MECHANISM
Filed Sept. 9, 1957

*INVENTOR.*
GILBERT H. HANNON
BY Warren F. B. Lindley
ATTORNEY

3,043,156
VARIABLE SPEED REPETITIVE CYCLE
TRANSMISSION MECHANISM
Gilbert H. Hannon, Sheboygan, Wis., assignor, by mesne assignments, to Hannon Engineering Company, Green Bay, Wis., a corporation of Wisconsin
Filed Sept. 9, 1957, Ser. No. 682,664
4 Claims. (Cl. 74—393)

This invention relates to transmission mechanisms and more particularly to means utilizing a constant speed drive for obtaining an accurately controlled variable speed repetitive cycle of operation.

Although this mechanism is applicable to an unlimited variety of machinery, paper converting machinery such as automatic wrappers, bag or pouch making machines and paper sheeters will be particularly considered.

For example, transmission mechanisms heretofore known for use with automatic bag making machines were designed to make one size bag without machine alterations, and other size bags could be formed by the machine only by a series of time consuming adjustments and part changes.

In paper converting machines employing either crimping or cutting operations or a combination of both, it is important that the linear velocity of the crimpers, cutter knife or both, and the anvil, correspond with the linear velocity of the paper during the time of the crimpers, cutter knife or both, and the anvil are in engagement with the paper. During the remainder of the revolution of the crimper, cutter and anvil rollers the rotating speed may vary. Thus, if the normal rotating speed of the crimper, cutter and anvil rollers is such that the normal linear velocity of any of the rollers is greater than the velocity of the paper, it is necessary to reduce the rotating speeds of that roller or rollers during the time that the crimping and cutting operations are being performed. If the normal rotating speed of the crimper, cutter and anvil rollers is such that the normal linear velocity of any of these rollers is less than the velocity of the paper, it is necessary to increase the rotating speed of that roller or rollers during the time that crimping or cutting operations are being performed.

Transmission mechanisms heretofore known in general required time consuming and expensive changes of machine parts in order to satisfy the above requirements. In order to satisfy the demands of industry for an unlimited variation in repeats or lengths of cutoff paper, many of the transmission mechanisms now employed merely approximate the paper speed during the time of crimping and cutting operations.

In accordance with the invention claimed, new and improved transmission mechanisms are provided which may be used with any machine requiring an accurately controlled variable speed repetitive cycle of operation. The particular automatic transmission mechanisms disclosed results in rapid changeover and high operating speeds in producing a large variety of articles such as pouches or bags. The size of these articles may be varied over a considerable range by a simple rapid adjustment of the transmission mechanism with extreme accuracy such as is required in the forming of modern pliable paper or plastic materials. Further, this adjustment can be made, if so desired, during the operation of the transmission mechanism.

This new and improved transmission mechanism may comprise a support, a drive member rotatably mounted on the support, a first driven member mounted on the support for reciprocal movement upon rotation of the drive member and a lever arm pivotally mounted on the support and being provided with a slot arranged at each end thereof. The first driven member is loosely connected with the lever arm. A second driven member is mounted on the support for reciprocal movement and having one end thereof loosely connected with the slot of the lever arm. The drive member causes variable speed reciprocal movement of the second driven member. The drive shaft may be driven at a constant speed and the second driven shaft may be connected to any operating mechanism such as, for example, a crimper, cutter and anvil roller of a bag making machine requiring an accurately controlled variable speed repetitive cycle of operation.

It is, therefore, one object of the present invention to provide a new and improved transmission mechanism for use in equipment in which an accurately controlled variable speed repetitive cycle of operation is obtained from a constant speed source of power.

Another object of this invention is to provide a new and improved transmission mechanism in which the requisite adjustments for different repetitive cycles of operation can be accurately made with the minimum of attention and labor.

A further object of this invention is to provide a new and improved transmission mechanism for paper converting machines which can be adjusted for different size repeats during operation of the transmission mechanism or machine.

A still further object of this invention is to provide a new and improved transmission mechanism which is simple, durable and economical in construction and operation.

Other objects and advantages of this invention will become apparent from the following description when read in connection with the accompanying drawings, in which.

Figure 1:
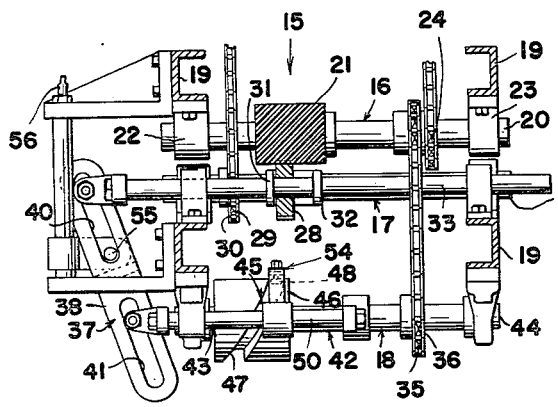
FIG. 1 is a side view partly in elevation of a transmission mechanism embodying the various features of the present invention.
Figure 2:
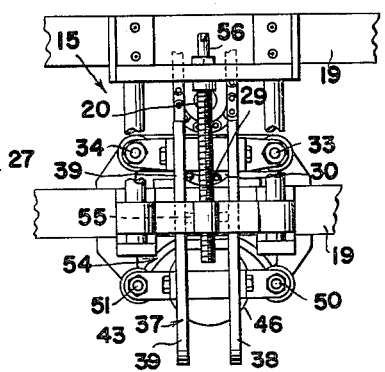
FIG. 2 is a left end view of FIG. 1.
Figure 3:
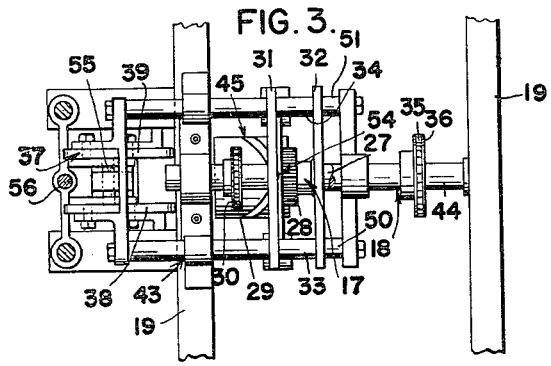
FIG. 3 is a plan view of the structure illustrated in FIG. 1.

Referring more particularly to the drawings by characters of reference FIGS. 1, 2 and 3 illustrate a transmission mechanism 15 comprising a first rotary unit 16 arranged adjacent a second rotary unit 17 and a third rotary unit 18 all mounted on a support 19.

The first rotary unit 16 comprises a drive member or shaft 20, a helical gear 21 secured to shaft 20 for rotation therewith, a pair of bearings 22 and 23 one at each end of the shaft, and a sprocket wheel 24 arranged for rotation therewith. Shaft 20 is actuated by any suitable source of power, for example, a constant speed electric motor through an endless conveyor (not shown) connected to suitable sprocket wheels including sprocket wheel 24.

The second rotary unit 17 comprises a driven member or shaft 27 which, for example, may be spaced from and parallelly arranged with shaft 20, a helical gear 28 slidably mounted on shaft 27 in rotating meshing engagement with helical gear 21, and a sprocket wheel 29 mounted on one end of shaft 27. Gear 28 is arranged for movement longitudinally of shaft 27. An external key-way (not shown) is used for engagement with a driving key in engagement with a mating keyway in helical gear 28. The sprocket wheel 29 is connected through an endless chain 30 to a machine forming member of, for example, an automatic bag or pouch making machine. Chain 30 may actuate crimper, cutter knife and anvil rollers.

The path of travel of gear 28 longitudinally of shaft 27 is controlled by collars 31 and 32 mounted on a pair of reciprocating rods 33 and 34 (one of which is shown in FIG. 1) suitably mounted in bearings on support 19 for longitudinal movement thereon. Rods 33 and 34 are arranged parallel to shaft 27 on opposite sides thereof. Collars 31 and 32 are secured to and arranged to extend between rods 33 and 34.

The force for actuating gear 28 along shaft 27 is obtained from a pivotally mounted lever arm 37. Lever arm 37 may comprise a pair of interconnected members 38 and 39 pivotally mounted on support 19 and each provided with a pair of slots 40 and 41 one slot being arranged at each end thereof. The members 38 and 39 of lever arm 37 are loosely connected in slots 40 at one end thereof to reciprocating rods 33 and 34.

Lever arm 37 is actuated through a given arcuate path by a drive member 42 and a driven member 43. Drive member 42 comprising a shaft 44 having a cam surface 45 arranged thereon for rotation therewith is actuated by any suitable source of power such as that used for rotating shaft 20 through a sprocket wheel 35 and chain 36 but should be substantially of the same speed of rotation as shaft 20. As shown in FIGS. 1 and 3 cam surface 45 is formed on a barrel cam 46 and comprises a groove formed in surface 45 to provide a predetermined endless path or track 47 for a cam follower 48. Cam follower 48 is mounted for movement on driven member 43 by means of a structure comprising a pair of reciprocating rods 50 and 51 (one of which is shown in FIG. 1). The follower structure comprises a C-shaped lever secured at each end to one of the reciprocating rods 50 and 51. Near the center of the C-shaped clamp is fixedly attached a suitable cam follower element 54, which is provided for following within the groove or track in cam surface 45. Rods 50 and 51 are arranged parallel to shaft 44 on opposite sides thereof and are loosely attached at like ends to the slots at the lower ends of members 38 and 39 of lever arm 27.

In order to provide variable speed movements of rods 50 and 51 cam surface 45 is so grooved that during revolutions thereof cam follower 48 is actuated longitudinally of cam surface 45 at varying speeds. This variable speed longitudinal movement of rods 50 and 51 is transmitted to lever arm 37 at the lower end and lever arm 37 transmits this longitudinal motion through a pivotal movement thereof into longitudinal motion of rods 33 and 34. Rods 33 and 34 actuate gear 28 longitudinally across helical gear 21. Helical gear 21 being rotated at a constant speed substantially identical to the speed of shaft 44 imparts to gear 28 a variable speed. Thus the rotational speed of gear 28 and shaft 27 associated therewith is a composite of the variable speed effects of helical gear 21 and cam surface 45. As known in the art, if gears 21 and 28 are helical gears and gear 28 travels longitudinally back and forth along shaft 27 while in meshing engagement with gear 21 the ratio of rotation of shaft 27 will be slower than the rotation of shaft 20 during the movement of gear 28 across gear 21 in one direction, but when gear 28 moves linearly in the opposite direction along shaft 27 there is an increase in the rotating speed of shaft 27 in spite of the fact that at all times gear 21 rotates at a constant speed.

The linear travel of gear 28 along shaft 27 is dependent upon the relationship of the point of pivotal connection of lever arm 37 with respect to the point of connection of rods 33, 34 and 50 and 51 within slots 40 and 41. If the relationship of the point of pivotal connection 55 of lever arm 37 to the position of rods 33, 34 and 50, 51 is as shown in FIG. 1 gear 28 will travel the greatest distance along the longitudinal axis of gear 21. If, however, pivot point 55 is moved upward toward rods 33 and 34 by actuating the turning adjusting screw 56 the loose connection of rods 33, 34 and 50, 51 to slots 40 and 41 respectively moves downward in the slots resulting in smaller longitudinal movement of rods 33, 34 and the same longitudinal movement of rods 50 and 51. By varying the length of travel of gear 28 across gear 21 the speed of rotation of gear 28 is varied. Thus, this structure provides a means of varying the speed of rotation of a gear by varying either or both of the speed components causing its rotation.

Figure 4:
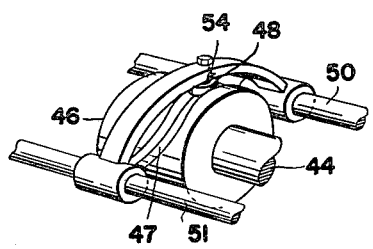
FIG. 4 is an enlarged perspective view of the cam follower illustrated in FIGS. 1–4.

FIG. 4 illustrates in detail the manner in which the cam follower 48 rides inside of the groove or track formed on cam surface 45 of barrel cam 46.

Figure 5:
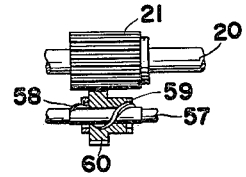
FIG. 5 illustrates a modification of the drive and driven shafts shown in FIG. 1 wherein a spiral thread is inserted in a cooperating groove formed in one of two mating gears.

FIG. 5 illustrates a modification of the driven shaft 27 and helical gear 28 shown in FIG. 1 wherein the driven shaft 57 is provided with a spiral thread 58 which cooperates with a spiral groove 59 formed in the walls of a bore extending axially through spur gear 60. The teeth of gear 60 formed in the outer periphery thereof are in meshing engagement with the teeth formed in the outer periphery of spur gear 21 mounted on drive shaft 20.

Figure 6:
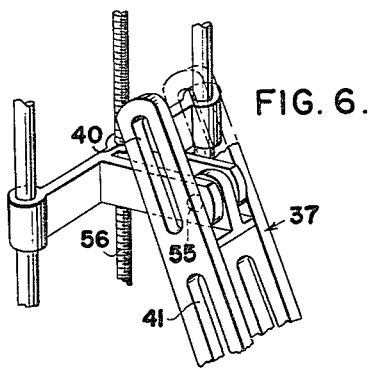
FIG. 6 is an enlarged perspective view of the lever arm structure shown in FIGS. 1, 2 and 3.

FIG. 6 is an enlarged perspective view of the lever arm structure shown in FIGS. 1, 2 and 3.

Although only one embodiment of the present invention has been described, it will be apparent to those skilled in the art that various changes and modifications may be made herein without departing from the spirit of the invention or from the scope of the appended claims.

It is claimed and desired to secure by Letters Patent:

1. A variable speed transmission mechanism comprising a support, a first drive member rotatably mounted on said support and having a cam surface arranged thereon for rotation therewith, a first driven member mounted on said support for reciprocal movement, a cam follower mounted on said first driven member for engagement with said cam surface, said cam surface actuating said first driven member in a reciprocating manner, a lever arm pivotally mounted on said support, said first driven member being pivotally connected to one end of said lever arm, a second driven member mounted on said support for reciprocal movement and having one end thereof pivotally connected to the other end of said lever arm, a second drive member mounted on said support, a first helical gear mounted on said second drive member, a third driven member, and a second helical gear mounted on said third driven member for rotation therewith, said first and second gears being in meshing engagement with each other, said second gear being arranged for movement longitudinally of said third driven member, means mounted on said second driven member for engaging said second gear for reciprocation in either direction, said cam surface in cooperation with said cam follower and said first driven member in cooperation with said lever arm causing variable speed reciprocal movement of said second gear.

2. A variable speed transmission mechanism comprising a support, a first drive member rotatably mounted on said support and having a cam surface arranged thereon for rotation therewith, a first driven member mounted on said support for reciprocal movement, a cam follower mounted on said first driven member for engagement with said cam surface, said cam surface actuating said first driven member in a reciprocating manner, a lever arm pivotally mounted on said support, said first driven member being pivotally connected to one end of said lever arm, a second driven member mounted on said support for reciprocal movement and having one end thereof pivotally connected to the other end of said lever arm, a second drive member mounted on said support, single means for driving said first drive member and said second drive member at the same speed, a first helical gear mounted on said second drive member, a third driven member, and a second helical gear mounted on said third driven member for rotation therewith, said first and second gears being in meshing engagement with each other, said second gear being arranged for movement longitudinally of said third driven member, means mounted on said second driven member for engaging said second gear for reciprocation in either direction, said cam surface in cooperation with said cam follower and said first driven member in cooperation with said lever arm causing variable speed reciprocal movement of said second gear.

3. A variable speed transmission mechanism comprising a support, a first drive member rotatably mounted on said support and having a cam surface arranged thereon for rotation therewith, a first driven member mounted on said support for longitudinal movement, a cam follower mounted on said first driven member for engagement with said cam surface, said cam surface actuating said first driven member longitudinally in a reciprocating manner, a lever arm pivotally mounted on said support and being provided with a pair of slots one arranged at each end thereof, said first driven member being loosely connected within one of said slots, a second driven member mounted on said support for longitudinal movement and having one end thereof loosely connected within the other of said slots, a second drive member mounted on said support, a first helical gear mounted on said second drive member, a third driven member and a second helical gear mounted on said third driven member for rotation therewith, said first and second gears being in meshing engagement with each other, said second gear being arranged for movement longitudinally of said third driven member, means mounted on said second driven member for engaging said second gear for reciprocation in either direction, said cam surface in cooperation with said cam follower and said first driven member in cooperation with said lever arm causing variable longitudinal movement of said second gear.

4. A variable speed transmission as recited in claim 3 further comprising means independent of said drive members for controlling the position of the pivotal mounting of said lever arm on said support.

References Cited in the file of this patent
UNITED STATES PATENTS

| | | |
|---|---|---|
| 2,305,070 | Butler et al. | Dec. 15, 1942 |
| 2,546,282 | Warren | Mar. 27, 1951 |
| 2,548,807 | Morgan et al. | Apr. 10, 1951 |
| 2,617,307 | Drissner | Nov. 11, 1952 |
| 2,635,514 | Roe | Apr. 21, 1953 |
| 2,803,226 | Renoux | Aug. 20, 1957 |
| 2,881,628 | Hannon | Apr. 14, 1959 |